(12) United States Patent
Davies

(10) Patent No.: US 8,990,542 B2
(45) Date of Patent: Mar. 24, 2015

(54) EFFICIENT METADATA PROTECTION SYSTEM FOR DATA STORAGE

(75) Inventor: Ian Robert Davies, Longmont, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 220 days.

(21) Appl. No.: 13/612,295

(22) Filed: Sep. 12, 2012

(65) Prior Publication Data

US 2014/0075136 A1    Mar. 13, 2014

(51) Int. Cl.
   *G06F 12/00* (2006.01)
   *G06F 12/12* (2006.01)

(52) U.S. Cl.
   CPC ...................................... *G06F 12/12* (2013.01)
   USPC ........... 711/206; 711/154; 711/207; 711/163; 711/E12.059

(58) Field of Classification Search
   CPC .............. G06F 12/1027; G06F 12/145; G06F 12/1009; G06F 12/10
   See application file for complete search history.

(56) References Cited

U.S. PATENT DOCUMENTS

| | | | |
|---|---|---|---|
| 5,893,152 A * | 4/1999 | Fuller et al. | 711/141 |
| 6,442,664 B1 * | 8/2002 | Maynard et al. | 711/203 |
| 6,658,592 B1 * | 12/2003 | Cohen et al. | 714/6.1 |
| 7,020,758 B2 | 3/2006 | Fisk | |
| 7,062,631 B1 * | 6/2006 | Klaiber et al. | 711/207 |
| 7,224,604 B2 | 5/2007 | Lasser | |
| 7,398,418 B2 | 7/2008 | Soran et al. | |
| 7,882,307 B1 | 2/2011 | Wentzlaff et al. | |
| 8,631,205 B1 | 1/2014 | Wentzlaff et al. | |
| 2007/0038840 A1 * | 2/2007 | Hummel et al. | 711/207 |
| 2009/0204872 A1 | 8/2009 | Yu et al. | |
| 2009/0240880 A1 | 9/2009 | Kawaguchi | |
| 2011/0252210 A1 | 10/2011 | Davies | |
| 2011/0252218 A1 | 10/2011 | Davies | |

OTHER PUBLICATIONS

Notice of Allowance for U.S. Appl. No. 12/898,203, mailed Oct. 22, 2012.
Office Action for U.S. Appl. No. 12/897,948, mailed Apr. 10, 2014.
Office Action for U.S. Appl. No. 12/897,948, mailed Oct. 24, 2014.

* cited by examiner

*Primary Examiner* — Matthew Bradley
*Assistant Examiner* — Arvind Talukdar
(74) *Attorney, Agent, or Firm* — Thomas J. Lavan

(57) ABSTRACT

A method for protecting page-level metadata in a storage system is provided. The method includes providing in a page table first protection data, receiving a command to read data from a page of the storage system corresponding to the page table, and comparing first protection data to second protection data. If the first protection data is different than the second protection data, then the method includes identifying third protection data in the storage system and comparing the third protection data to the first protection data. If the third protection data is different than the first protection data, then the method includes determining that the page-level metadata is inconsistent.

20 Claims, 14 Drawing Sheets

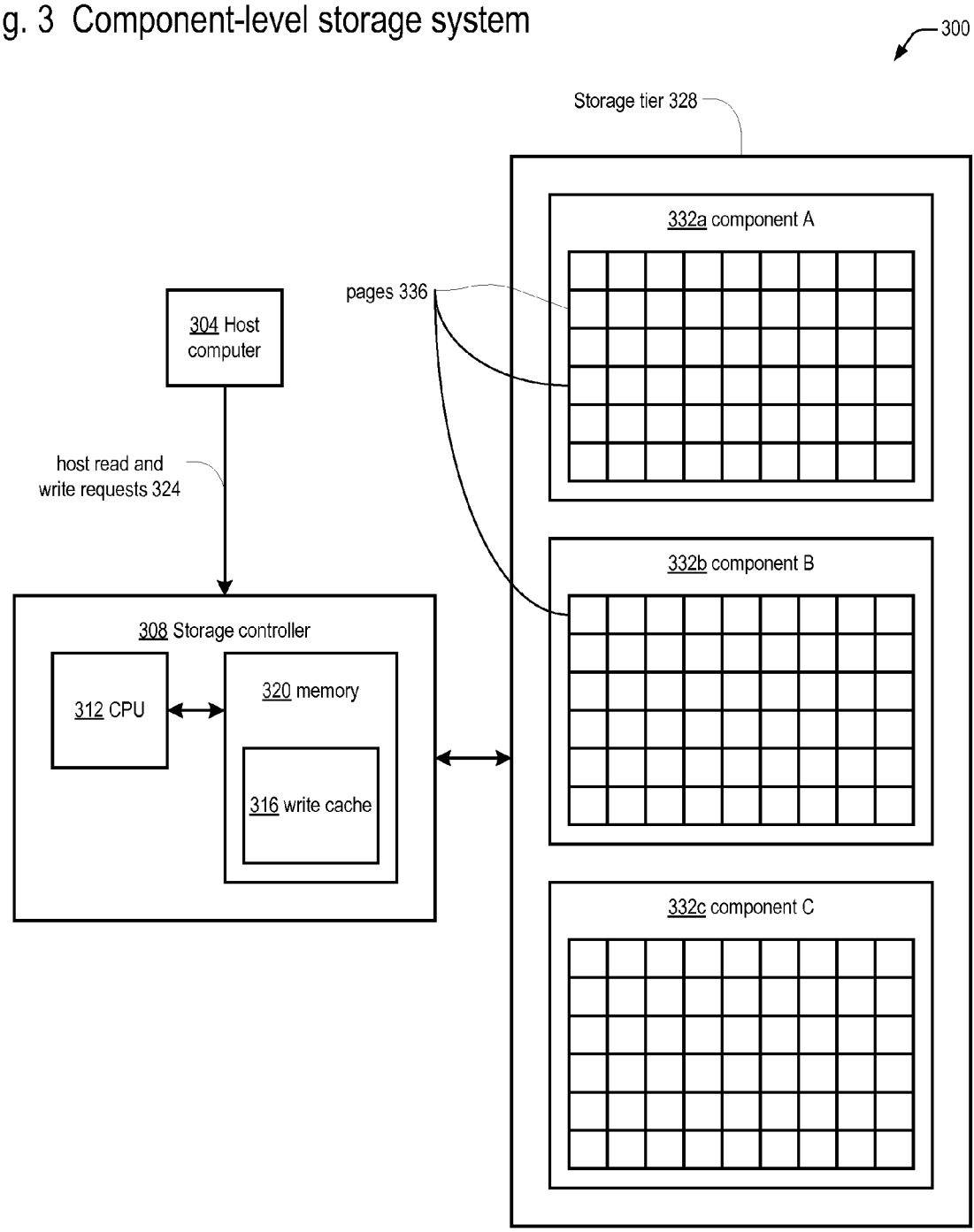

Fig. 4 LUN and page table relationship
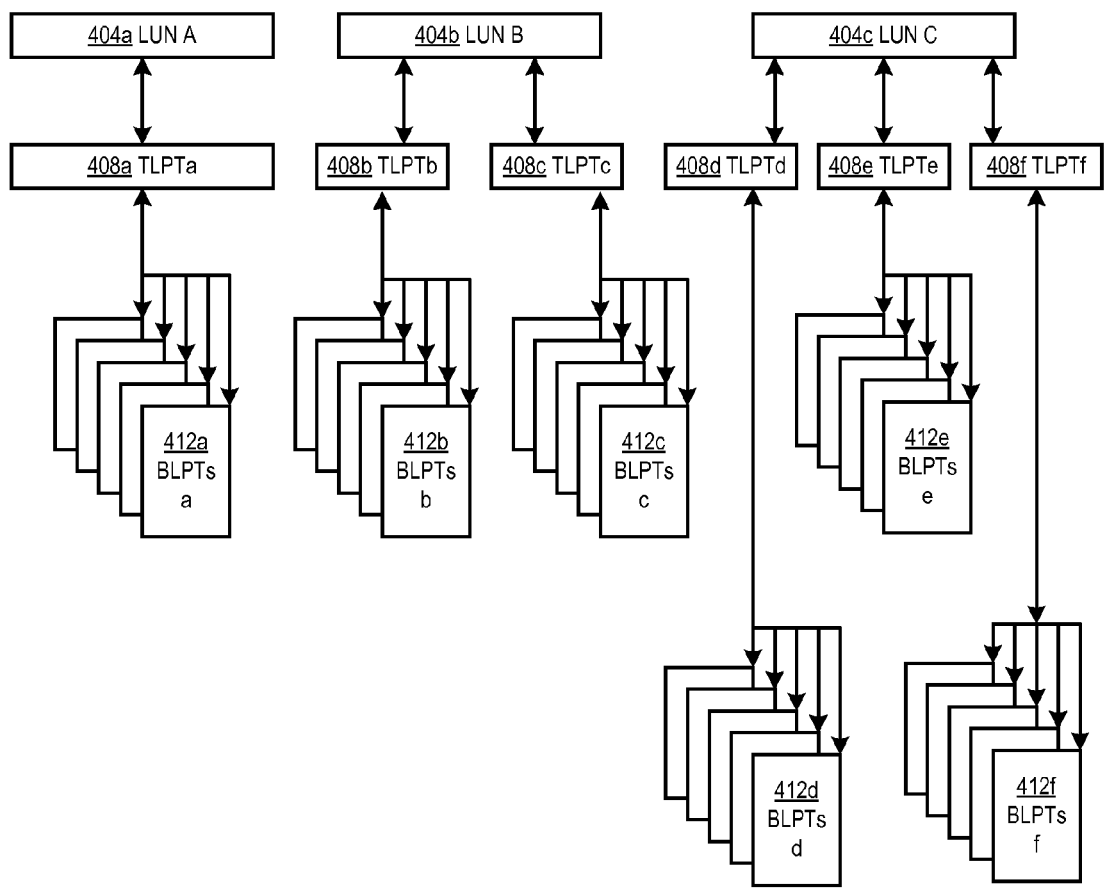

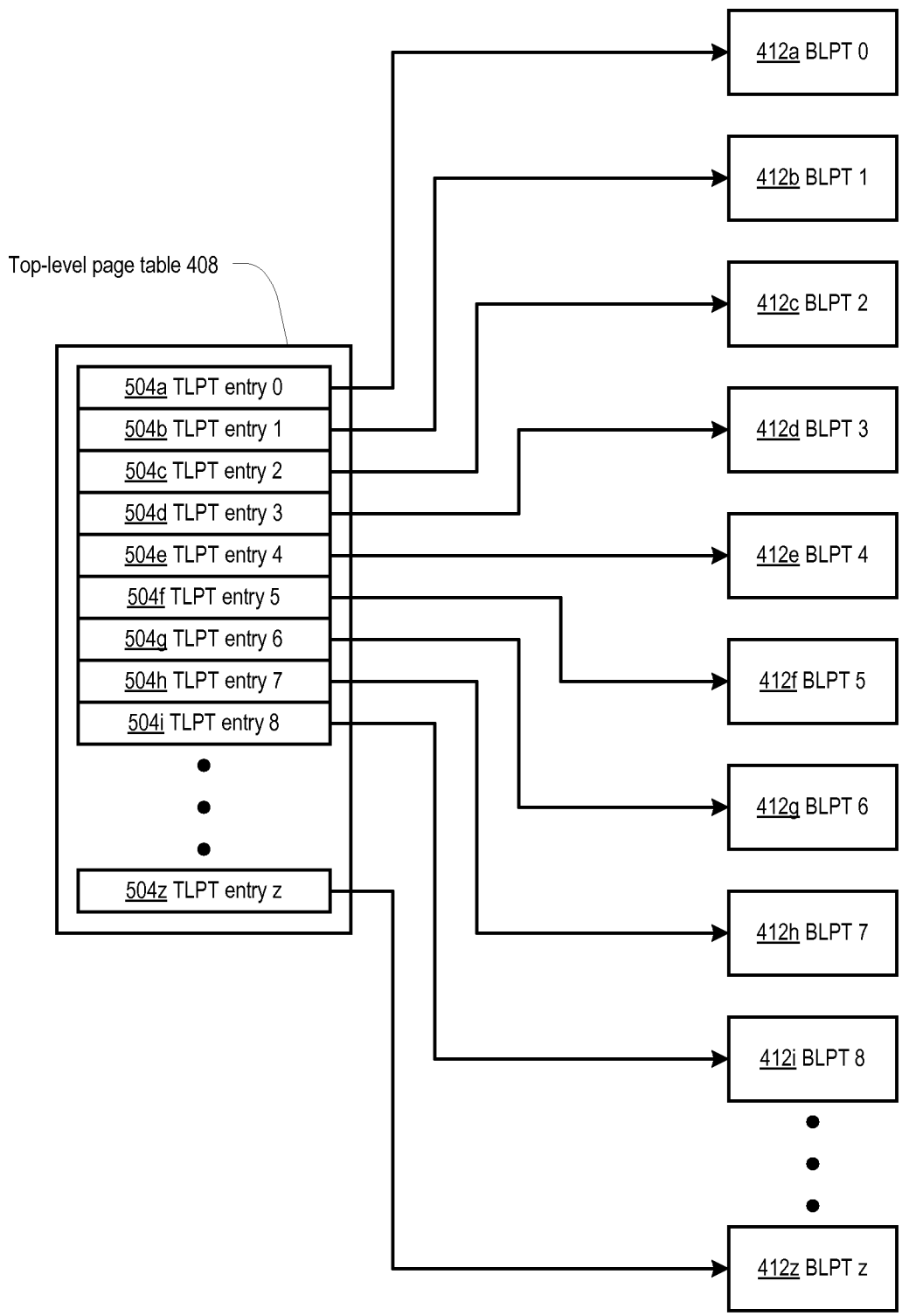
Fig. 5 Two level page table organization

Fig. 6a  Logical Block Address (LBA)
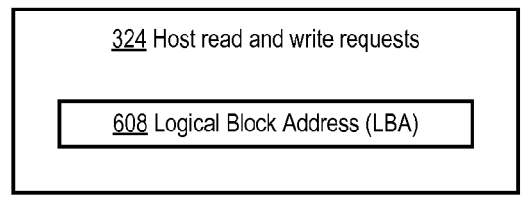
Fig. 6b  LBA and page table relationship
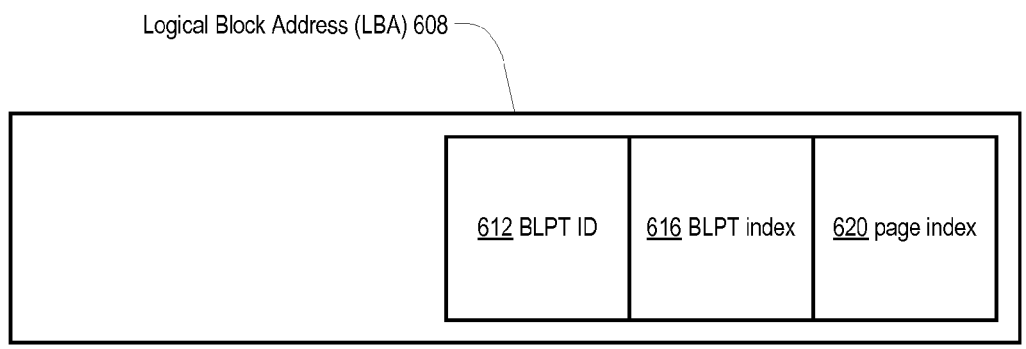

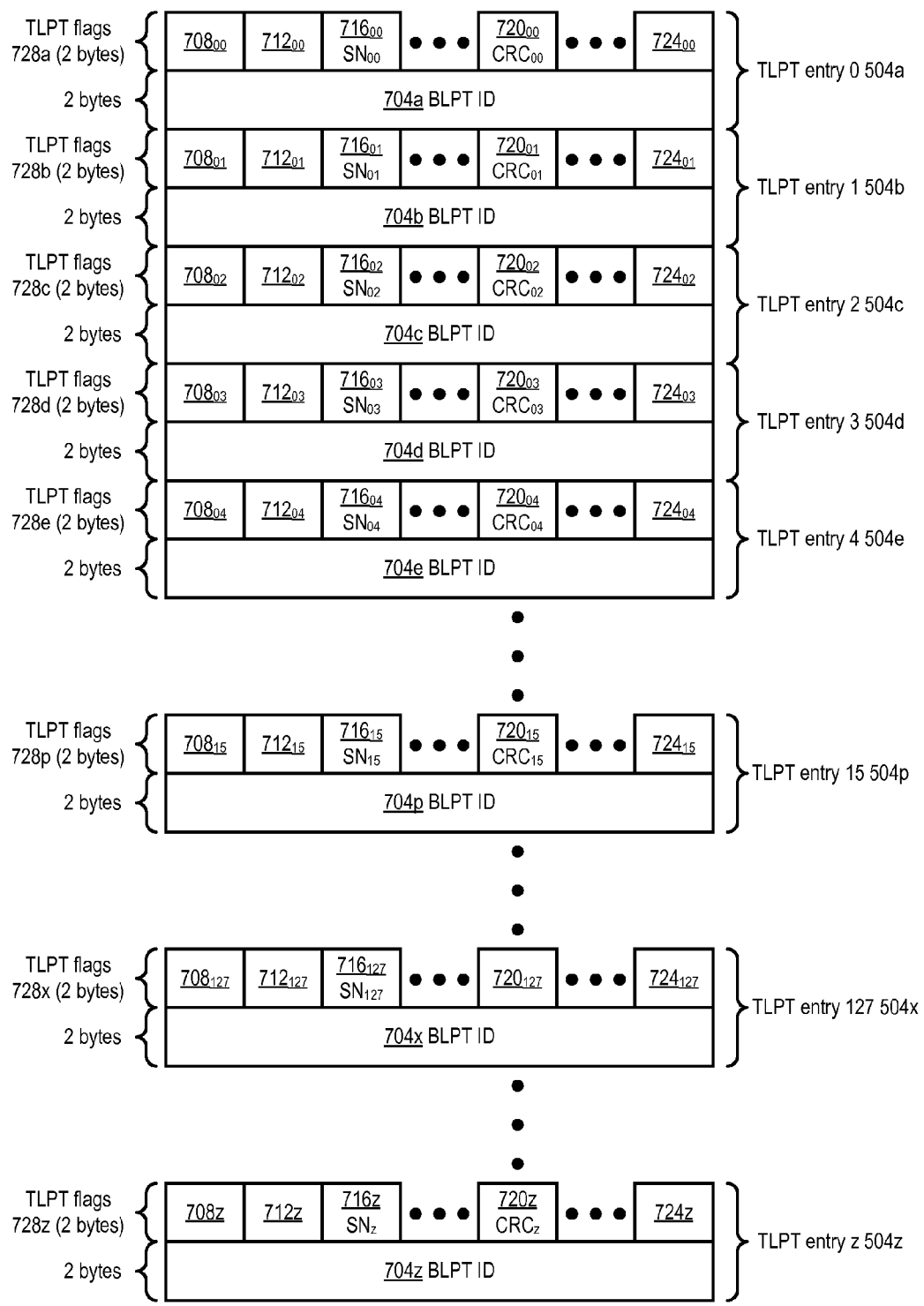
Fig. 7a Protection information bit storage in TLPT

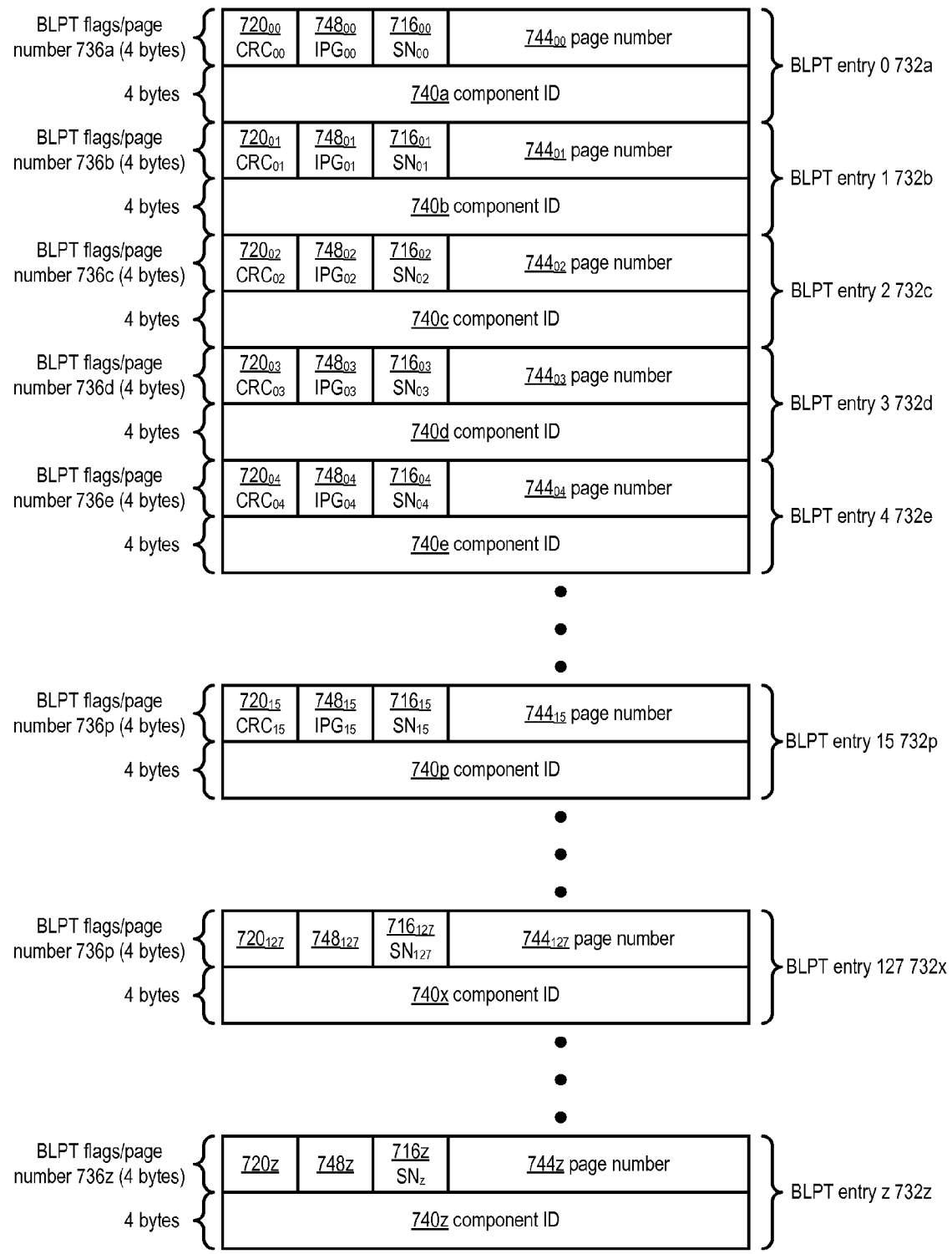
Fig. 7b Protection information bit storage in BLPT

Fig. 8a  CRC bits from TLPT and BLPT entries

| $720_{00}$ $CRC_{00}$ | $720_{01}$ $CRC_{01}$ | $720_{02}$ $CRC_{02}$ | $720_{03}$ $CRC_{03}$ | $720_{04}$ $CRC_{04}$ | $720_{05}$ $CRC_{05}$ | $720_{06}$ $CRC_{06}$ | $720_{07}$ $CRC_{07}$ |
|---|---|---|---|---|---|---|---|
| $720_{08}$ $CRC_{08}$ | $720_{09}$ $CRC_{09}$ | $720_{10}$ $CRC_{10}$ | $720_{11}$ $CRC_{11}$ | $720_{12}$ $CRC_{12}$ | $720_{13}$ $CRC_{13}$ | $720_{14}$ $CRC_{14}$ | $720_{15}$ $CRC_{15}$ |

} 16 bits/2 bytes

Fig. 8b  LUN serial number bits from TLPT and BLPT entries

| $716_{00}$ $SN_{00}$ | $716_{01}$ $SN_{01}$ | $716_{02}$ $SN_{02}$ | $716_{03}$ $SN_{03}$ | $716_{04}$ $SN_{04}$ | $716_{05}$ $SN_{05}$ | $716_{06}$ $SN_{06}$ | $716_{07}$ $SN_{07}$ |
|---|---|---|---|---|---|---|---|
| $716_{08}$ $SN_{08}$ | $716_{09}$ $SN_{09}$ | $716_{10}$ $SN_{10}$ | $716_{11}$ $SN_{11}$ | $716_{12}$ $SN_{12}$ | $716_{13}$ $SN_{13}$ | $716_{14}$ $SN_{14}$ | $716_{15}$ $SN_{15}$ |
| $716_{16}$ $SN_{16}$ | $716_{17}$ $SN_{17}$ | $716_{18}$ $SN_{18}$ | $716_{19}$ $SN_{19}$ | $716_{20}$ $SN_{20}$ | $716_{21}$ $SN_{21}$ | $716_{22}$ $SN_{22}$ | $716_{23}$ $SN_{23}$ |
| $716_{24}$ $SN_{24}$ | $716_{25}$ $SN_{25}$ | $716_{26}$ $SN_{26}$ | $716_{27}$ $SN_{27}$ | $716_{28}$ $SN_{28}$ | $716_{29}$ $SN_{29}$ | $716_{30}$ $SN_{30}$ | $716_{31}$ $SN_{31}$ |
| $716_{32}$ $SN_{32}$ | $716_{33}$ $SN_{33}$ | $716_{34}$ $SN_{34}$ | $716_{35}$ $SN_{35}$ | $716_{36}$ $SN_{36}$ | $716_{37}$ $SN_{37}$ | $716_{38}$ $SN_{38}$ | $716_{39}$ $SN_{39}$ |
| $716_{40}$ $SN_{40}$ | $716_{41}$ $SN_{41}$ | $716_{42}$ $SN_{42}$ | $716_{43}$ $SN_{43}$ | $716_{44}$ $SN_{44}$ | $716_{45}$ $SN_{45}$ | $716_{46}$ $SN_{46}$ | $716_{47}$ $SN_{47}$ |
| $716_{48}$ $SN_{48}$ | $716_{49}$ $SN_{49}$ | $716_{50}$ $SN_{50}$ | $716_{51}$ $SN_{51}$ | $716_{52}$ $SN_{52}$ | $716_{53}$ $SN_{53}$ | $716_{54}$ $SN_{54}$ | $716_{55}$ $SN_{55}$ |
| $716_{56}$ $SN_{56}$ | $716_{57}$ $SN_{57}$ | $716_{58}$ $SN_{58}$ | $716_{59}$ $SN_{59}$ | $716_{60}$ $SN_{60}$ | $716_{61}$ $SN_{61}$ | $716_{62}$ $SN_{62}$ | $716_{63}$ $SN_{63}$ |
| $716_{64}$ $SN_{64}$ | $716_{65}$ $SN_{65}$ | $716_{66}$ $SN_{66}$ | $716_{67}$ $SN_{67}$ | $716_{68}$ $SN_{68}$ | $716_{69}$ $SN_{69}$ | $716_{70}$ $SN_{70}$ | $716_{71}$ $SN_{71}$ |
| $716_{72}$ $SN_{72}$ | $716_{73}$ $SN_{73}$ | $716_{74}$ $SN_{74}$ | $716_{75}$ $SN_{75}$ | $716_{76}$ $SN_{76}$ | $716_{77}$ $SN_{77}$ | $716_{78}$ $SN_{78}$ | $716_{79}$ $SN_{79}$ |
| $716_{80}$ $SN_{80}$ | $716_{81}$ $SN_{81}$ | $716_{82}$ $SN_{82}$ | $716_{83}$ $SN_{83}$ | $716_{84}$ $SN_{84}$ | $716_{85}$ $SN_{85}$ | $716_{86}$ $SN_{86}$ | $716_{87}$ $SN_{87}$ |
| $716_{88}$ $SN_{88}$ | $716_{89}$ $SN_{89}$ | $716_{90}$ $SN_{90}$ | $716_{91}$ $SN_{91}$ | $716_{92}$ $SN_{92}$ | $716_{93}$ $SN_{93}$ | $716_{94}$ $SN_{94}$ | $716_{95}$ $SN_{95}$ |
| $716_{96}$ $SN_{96}$ | $716_{97}$ $SN_{97}$ | $716_{98}$ $SN_{98}$ | $716_{99}$ $SN_{99}$ | $716_{100}$ $SN_{100}$ | $716_{101}$ $SN_{101}$ | $716_{102}$ $SN_{102}$ | $716_{103}$ $SN_{103}$ |
| $716_{104}$ $SN_{104}$ | $716_{105}$ $SN_{105}$ | $716_{106}$ $SN_{106}$ | $716_{107}$ $SN_{107}$ | $716_{108}$ $SN_{108}$ | $716_{109}$ $SN_{109}$ | $716_{110}$ $SN_{110}$ | $716_{111}$ $SN_{111}$ |
| $716_{112}$ $SN_{112}$ | $716_{113}$ $SN_{113}$ | $716_{114}$ $SN_{114}$ | $716_{115}$ $SN_{115}$ | $716_{116}$ $SN_{116}$ | $716_{117}$ $SN_{117}$ | $716_{118}$ $SN_{118}$ | $716_{119}$ $SN_{119}$ |
| $716_{120}$ $SN_{120}$ | $716_{121}$ $SN_{121}$ | $716_{122}$ $SN_{122}$ | $716_{123}$ $SN_{123}$ | $716_{124}$ $SN_{124}$ | $716_{125}$ $SN_{125}$ | $716_{126}$ $SN_{126}$ | $716_{127}$ $SN_{127}$ |

} 128 bits/16 bytes

Fig. 8c  TLPT index bits from BLPT entries

| $748_{00}$ | $748_{01}$ | $748_{02}$ | $748_{03}$ | $748_{04}$ | $748_{05}$ | $748_{06}$ | $748_{07}$ |
|---|---|---|---|---|---|---|---|
| $IPG_{00}$ | $IPG_{01}$ | $IPG_{02}$ | $IPG_{03}$ | $IPG_{04}$ | $IPG_{05}$ | $IPG_{06}$ | $IPG_{07}$ |
| $748_{08}$ | $748_{09}$ | $748_{10}$ | $748_{11}$ | $748_{12}$ | $748_{13}$ | $748_{14}$ | $748_{15}$ |
| $IPG_{08}$ | $IPG_{09}$ | $IPG_{10}$ | $IPG_{11}$ | $IPG_{12}$ | $IPG_{13}$ | $IPG_{14}$ | $IPG_{15}$ |

} 16 bits/2 bytes

Fig. 9  Metadata protection information
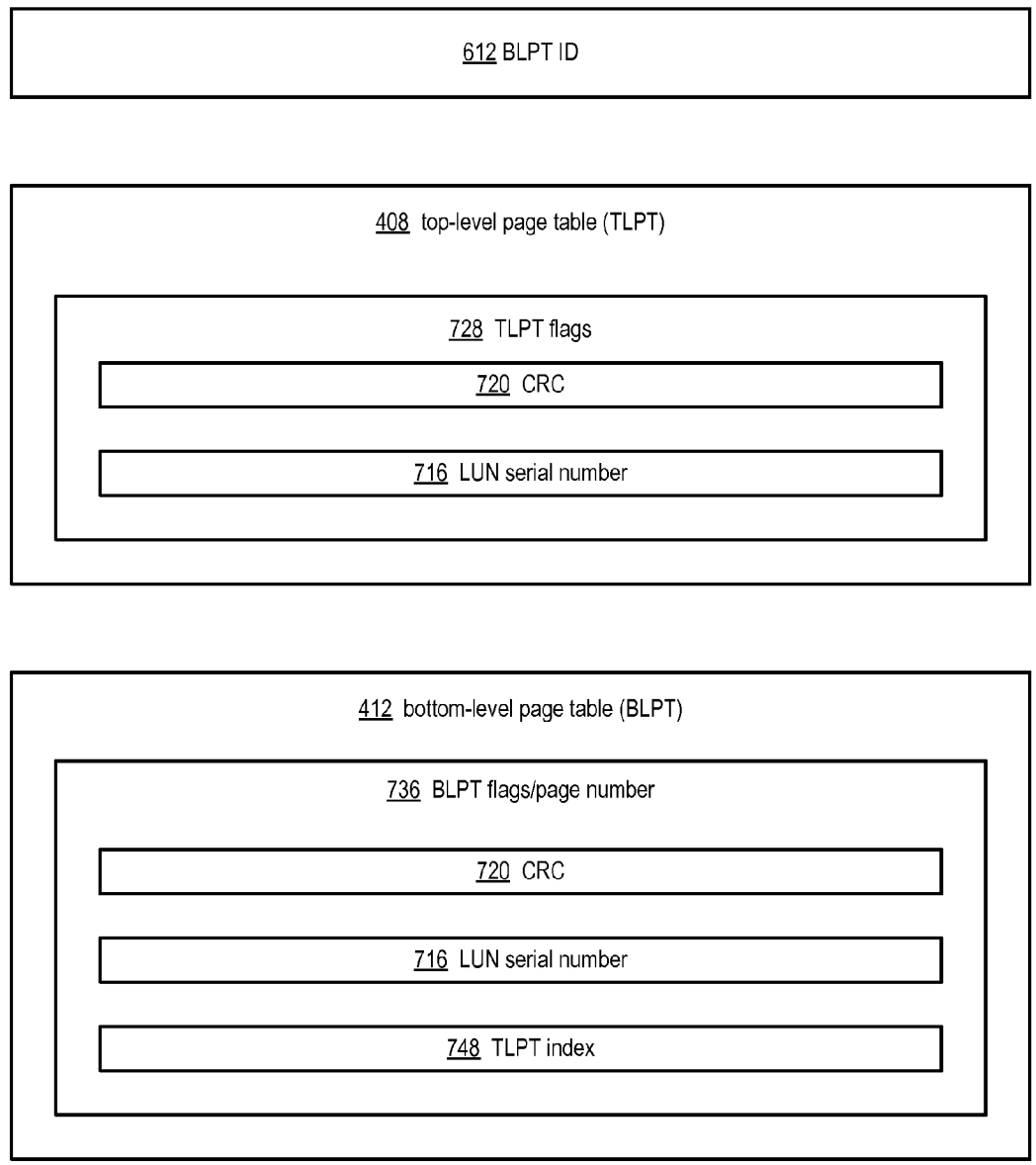

Fig. 10 Create/update TLPT or BLPT
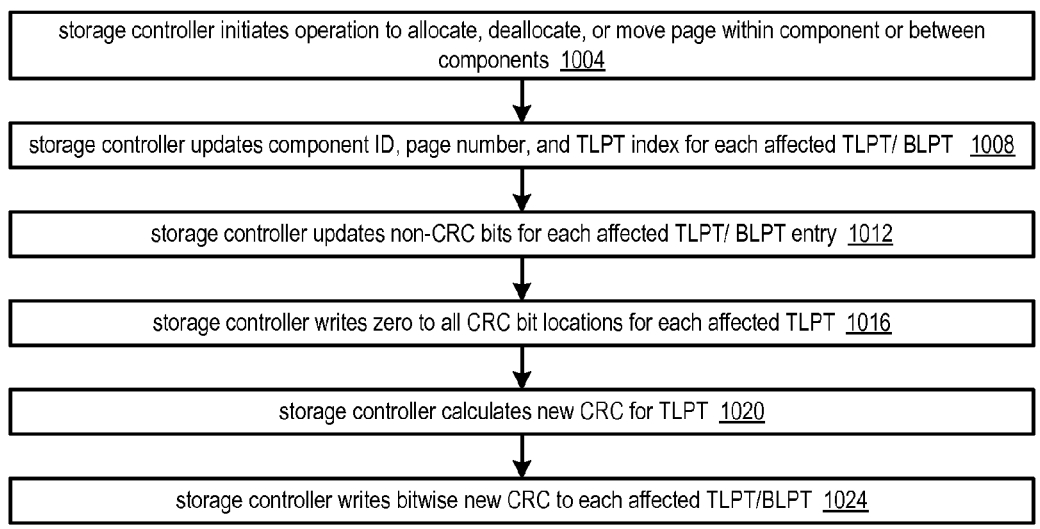

Fig. 11a   Check component metadata
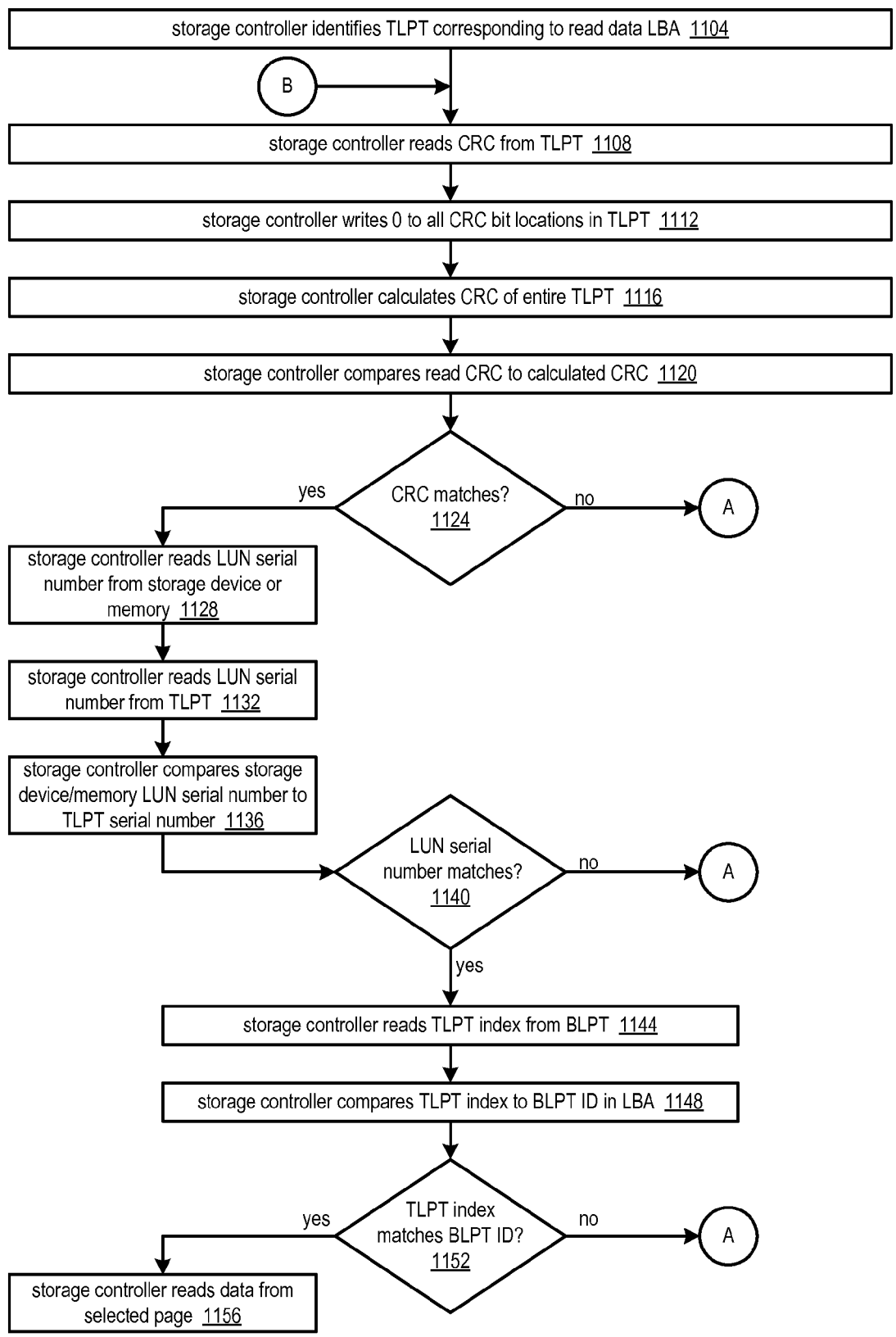

Fig. 11b Alternate component metadata identification
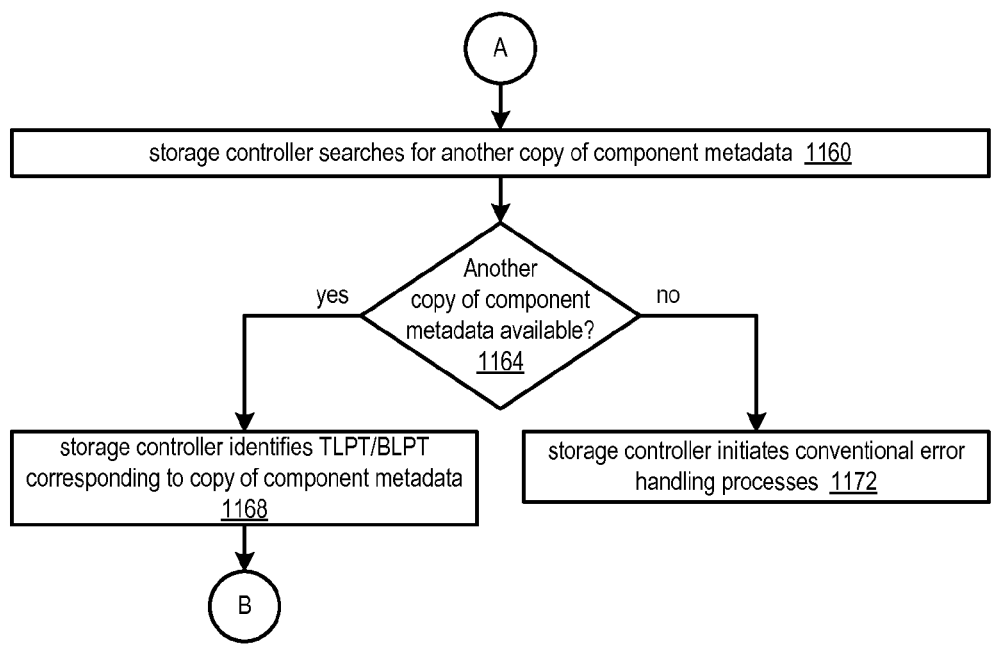

EFFICIENT METADATA PROTECTION SYSTEM FOR DATA STORAGE

FIELD

The present invention is directed to computer data storage systems. In particular, the present invention is directed to methods and apparatuses for efficiently storing and accessing metadata protection information in data storage systems.

BACKGROUND

Computers utilize a variety of data storage approaches for mass data storage. Various types of data storage devices and organization of groups of data storage devices are used to provide primary storage, near line storage, backup storage, hierarchical storage, and various types of storage virtualization and data replication.

Data storage devices include tape storage, disk drives, optical drives, and solid state disks. In terms of performance, solid state disks provide the best performance, followed by hard disk drives. Optical and tape storage devices provide significantly slower performance compared to hard disk drives and solid state disks.

Within a given storage device type, various storage devices may have different performance attributes. For example, hard disk drives come in multiple rotation speeds, cache sizes, track density, and other physical parameters. Rotation speeds of 5,400, 7,200, 10,000, and 15,000 RPM are currently available, with cache sizes ranging from 32 MB to 8 GB and more. Therefore, it is possible to create sub-groups of a particular storage device type based on performance attributes of each sub-group.

Although it would be desirable to have unlimited amounts of the fastest possible data storage, in most cases that approach is cost prohibitive and a waste of money. Solid state disks, for example, make a very inefficient choice for offline data storage, where data can often be written off-hours when data networks and servers are lightly used. Additionally, data storage needs almost always increase over time in order to accommodate new data to be stored, backed up, virtualized, and so on.

SUMMARY

The present invention is directed to solving disadvantages of the prior art. In accordance with embodiments of the present invention, a method for protecting page-level metadata in a storage system is provided. The method includes providing in a page table first protection data, receiving a command to read data from a page of the storage system corresponding to the page table and comparing first protection data to second protection data. If the first protection data is different than the second protection data, then the method includes identifying third protection data in the storage system and comparing the third protection data to the first protection data. If the third protection data is different than the first protection data, then the method includes determining that the page-level metadata is inconsistent.

In accordance with other embodiments of the present invention, a storage system for protecting page-level metadata is provided. The storage system includes at least one storage device. The at least one storage device includes at least one component having at least one page and a storage controller coupled to the at least one storage device. The storage controller includes a processor and a memory coupled to the processor. The memory includes a page table having first protection data. In response to the storage controller receiving a command to read data from a page of the storage system corresponding to the page table, the processor compares the first protection data to second protection data. If the processor determines that the first protection data is different than the second protection data, the processor identifies third protection data in the storage system and compares the third protection data to the first protection data. If the processor determines the third protection data is different than the first protection data, the processor determines that the page-level metadata is inconsistent.

In accordance with still other embodiments of the present invention, a storage controller for protecting page-level metadata in a storage system is provided. The storage controller includes a processor and a memory, coupled to the processor. The memory includes a page table. The storage controller stores data on one or more storage devices of the storage system. The one or more storage devices include one or more components. The one or more components include one or more pages, the one or more pages corresponding to entries of the page table. The storage controller determines a page must be allocated, de-allocated, or moved within or between the one or more components. The storage controller updates a component ID and a page number in an entry of the page table, calculates protection information for the page table, and writes the protection information bitwise into sequential entries of the page table.

One advantage of the present invention is that it adds protection information to page tables for tiered storage systems. Although SCSI-level protection information (PI) may be available, SCSI-level protection information operates at the block level, and is not suitable for use in component-level storage systems. Page tables contain page and component-level metadata. The metadata provides addressing information so that logical addresses from host computers are translated to component ID, page number, and storage device location. If the metadata is corrupted, it may be impossible to find the corresponding data on storage devices. Although page tables may be mirrored to other locations, there must be a mechanism to know if a given page table is corrupted. The present invention includes one or more types of protection information in a page table so it is possible to determine if a given page table contains reliable metadata or is inconsistent.

Another advantage of the present invention is that it adds metadata redundancy to page tables without increasing the size of page tables. In order to facilitate fast lookup of data, page tables are organized in sizes that are a power of 2. Therefore, a page table is commonly 16K Bytes, 32K Bytes, or 64K Bytes in size, and does not need to increase in size when protection information is included in the page table. The present invention stores protection information bitwise in available sequential locations of page tables, and does not require allocating additional page table entries to store protection information. For example, a page table that is 32K Bytes in size will need to expand to 64K Bytes if even one additional parallel entry is provided beyond 32K Bytes.

Additional features and advantages of embodiments of the present invention will become more readily apparent from the following description, particularly when taken together with the accompanying drawings.

BRIEF DESCRIPTION OF THE DRAWINGS

FIG. 3 is a block diagram illustrating a component-level storage system in accordance with embodiments of the present invention.

FIG. 4 is a block diagram illustrating LUN and page table relationships in accordance with embodiments of the present invention.

FIG. 5 is a block diagram illustrating a two-level page table organization in accordance with embodiments of the present invention.

FIG. 6a is a block diagram illustrating a Logical Block Address (LBA) in accordance with embodiments of the present invention.

FIG. 6b is a block diagram illustrating a Logical Block Address (LBA) and page table relationship in accordance with embodiments of the present invention.

FIG. 7a is a block diagram illustrating protection information bit storage in a top-level page table in accordance with embodiments of the present invention.

FIG. 7b is a block diagram illustrating protection information bit storage in a bottom-level page table in accordance with embodiments of the present invention.

FIG. 8a is a block diagram illustrating cyclic redundancy check (CRC) bits from TLPT and BLPT entries in accordance with embodiments of the present invention.

FIG. 8b is a block diagram illustrating Logical Unit Number (LUN) serial number bits from TLPT and BLPT entries in accordance with embodiments of the present invention.

FIG. 8c is a block diagram illustrating TLPT index bits from BLPT entries in accordance with embodiments of the present invention.

FIG. 9 is a block diagram illustrating metadata protection information in accordance with embodiments of the present invention.

FIG. 10 is a flowchart illustrating a create/update TLPT or BLPT process in accordance with embodiments of the present invention.

FIG. 11a is a flowchart illustrating a check component metadata process in accordance with embodiments of the present invention.

FIG. 11b is a flowchart illustrating an alternate component metadata identification process in accordance with embodiments of the present invention.

DETAILED DESCRIPTION

Figure 1A:
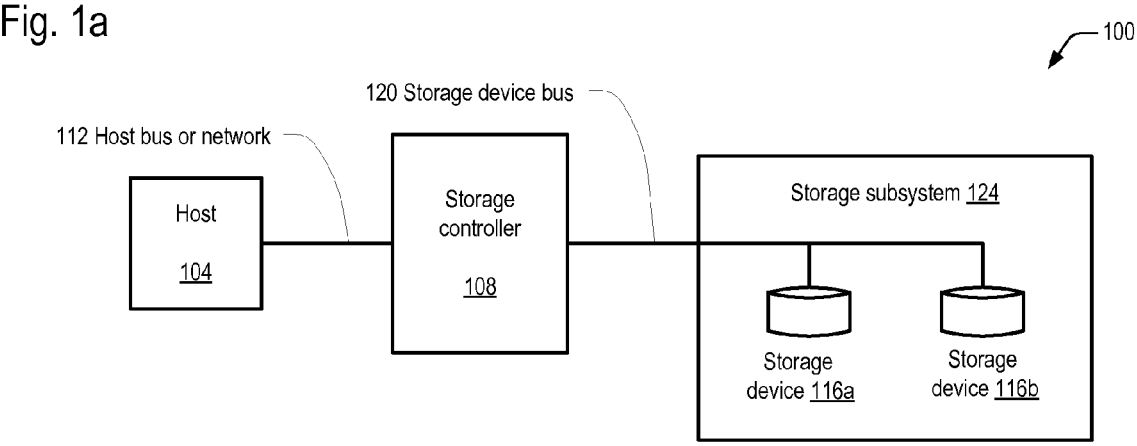
FIG. 1a is a block diagram illustrating components of a first non host-based data storage system in accordance with embodiments of the present invention.

A storage tier is a collection of data storage elements having similar performance characteristics, as defined by the user. Performance is generally expressed in terms of Megabytes per second (MB/s) for sequential workloads and I/Os per second (IOPs) for random workloads. A storage tier may contain one type of data storage, or multiple types, and a storage system would have at least one, and possibly several, storage tiers. In a practical sense, storage components and storage tiers apply to randomly accessible data storage means, including several technologies of hard disk drives and solid state disk. A storage tier may reflect a specific performance level (usually reflecting a single type of storage device), or may reflect a range of performance parameters such as above a certain IOPs number or MB/s above a certain number and below a different number. For example, a storage system may have three components: one with solid state disk (SSD), one with enterprise-class SAS drives, and one with midline/near line storage (such as less expensive SATA disk drives or low end SAS disk drives with SATA mechanical structures and a SAS interface). Among hard disk drive technologies, Enterprise class disks are generally the fastest means of storage and in one embodiment have 10K/15K RPM and fast seeks. However, solid state disks (SSDs) are today the performance leaders.

A storage component is any logically-addressable storage entity. It could be a single storage device, a RAID volume, or a separate partition on either a single storage device or multiple storage devices. Relative to the present invention, there are one or more components within a tier. The problem space involves storing and accessing protection metadata in a page table, where the protection information allows storage controllers to determine if the metadata in a given page table is reliable or not.

Every component is organized into storage pages. A page is the smallest unit for newly allocated storage space, although multiple pages may need to be allocated to satisfy a write request. If multiple newly allocated pages are required, the allocated pages may be physically adjacent or not adjacent. However, the allocated pages would be logically adjacent.

A page can be any size, but in a preferred embodiment is 4M Bytes. In a practical sense, the minimum page size is a sector size, which would be commonly 512K Bytes (or 4K Bytes in newer disk drives), and the maximum size would be perhaps 64M Bytes-128M Bytes. However, these limits are somewhat arbitrary, and reflect the amount of storage required for storage component data structures. More storage is required for data structures when smaller page sizes are used, since more page data structures are required. The larger the page size, the potential for more wasted or unused space within an allocated page. Another disadvantage of large pages is the time it takes to move a large page is greater than the time required to move a small page since large pages store more metadata. Each page stores multiple blocks, where blocks are disk sectors. In one embodiment, the block size is 512 Bytes, and there would be 8,192 blocks in a 4M Byte page. In another embodiment, the block size is 4K Bytes and there would be 2048 blocks in an 8M Byte page.

The present invention is directed to providing metadata protection for component-based data storage systems. In a preferred embodiment, a RAID controller performs the management of storage components. Either RAID controller hardware or firmware running on a CPU of the RAID controller performs the present invention. In other embodiments, a non-RAID storage controller or host adapter performs the invention. In other embodiments, a host device driver or storage application performs the invention. In other embodiments, a network switch or storage appliance performs the invention.

Referring now to FIG. 1a, a block diagram illustrating components of a first non host-based data storage system 100 in accordance with embodiments of the present invention is shown.

The data storage system 100 includes one or more host computers 104. Host computer 104 is generally a server, but could also be a desktop or mobile computer. Host computer 104 executes application programs that generate read and write requests to storage controller 108 over host bus or network 112. Host bus or network 112 in one embodiment is a bus such as SCSI, FC-AL, USB, Firewire, SSA, SAS, SATA, or Infiniband. In another embodiment, host bus or network 112 is a network such as Ethernet, iSCSI, Fibre Channel, SSA, ESCON, ATM, FICON, or Infiniband.

Host computer 104 interfaces with one or more storage controllers 108, although only a single storage controller 108 is illustrated for clarity. In one embodiment, storage controller 108 is a RAID controller. In another embodiment, storage controller 108 is a storage appliance such as a provisioning, virtualization, replication, or backup appliance. Storage controller 108 transfers data to and from storage devices 116a, 116b in storage subsystem 124, over storage device bus 120. Storage device bus 120 is any suitable storage bus or group of buses for transferring data directly between storage controller 108 and storage devices 116, including but not limited to SCSI, Fibre Channel, SAS, SATA, or SSA.

Storage subsystem 124 in one embodiment contains twelve storage devices 116. In other embodiments, storage subsystem 124 may contain fewer or more than twelve storage devices 116. Storage devices 116 include various types of storage devices, including hard disk drives, solid state drives, optical drives, and tape drives. Within a specific storage device type, there may be several sub-categories of storage devices 116, organized according to performance. For example, hard disk drives may be organized according to cache size, drive RPM (5,400, 7,200, 10,000, and 15,000, for example), queue depth, random transfer rate, or sequential transfer rate.

Figure 1B:
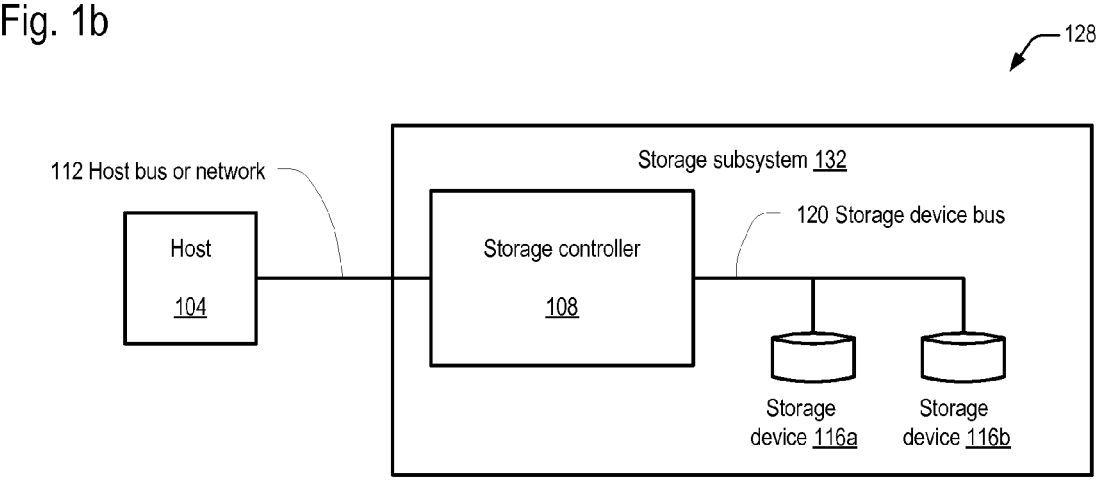
FIG. 1b is a block diagram illustrating components of a second non host-based data storage system in accordance with embodiments of the present invention.

Referring now to FIG. 1b, a block diagram illustrating components of a second non host-based data storage system 128 in accordance with embodiments of the present invention is shown. Non host-based data storage system 128 is similar to non host-based data storage system 100, with the exception being storage controller 108 is within storage subsystem 132, along with storage devices 116. In the embodiment illustrated in FIG. 1b, storage controller 108 is a single RAID controller 108. However, in other embodiments, storage controller 108 represents multiple RAID controllers 108.

Figure 1C:
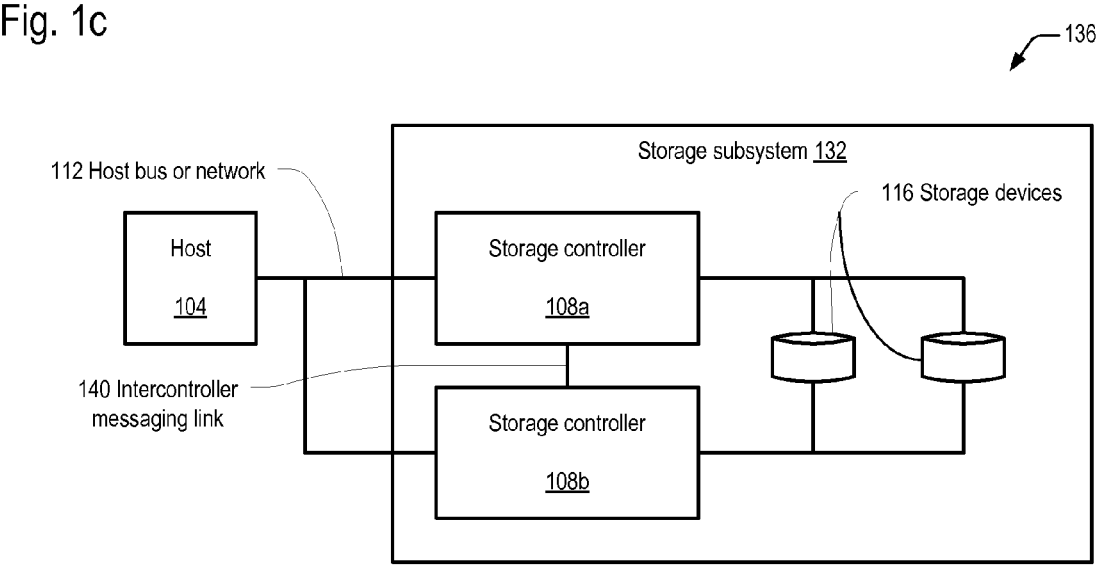
FIG. 1c is a block diagram illustrating components of a third non host-based data storage system in accordance with embodiments of the present invention.

Referring now to FIG. 1c, a block diagram illustrating components of a third host-based data storage system 136 in accordance with embodiments of the present invention is shown. Data storage system 136 is similar to data storage systems 100 and 128, except storage controller 108 represents two redundant storage controllers 108a, 108b. In one embodiment, storage controllers 108a, 108b utilize active-active failover in order to have continued availability to storage devices 116 by host 104 in the event of a failure of one of storage controllers 108a, 108b. Intercontroller messaging link 140 provides a communication and data path between storage controllers 108a, 108b in order to mirror write data and synchronize failover and failback operations.

Figure 2A:
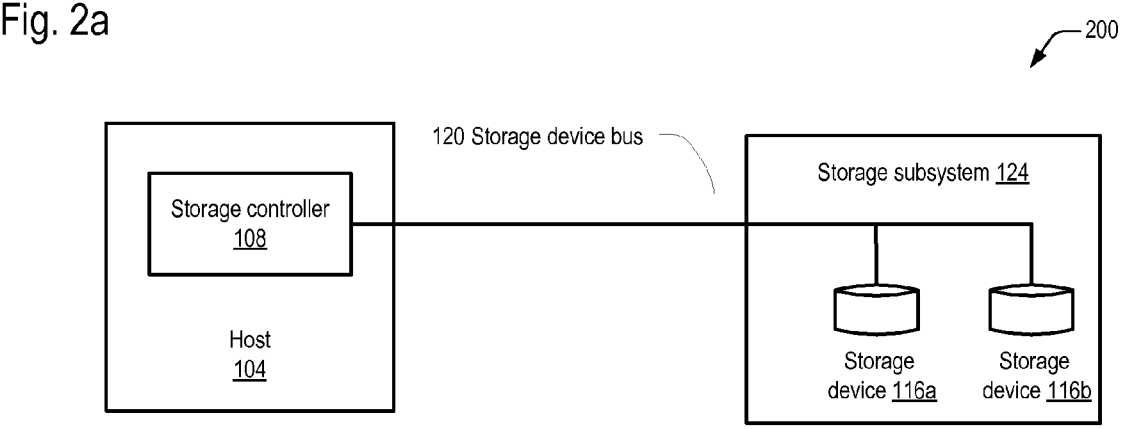
FIG. 2a is a block diagram illustrating components of a first host-based data storage system in accordance with embodiments of the present invention.

Referring now to FIG. 2a, a block diagram illustrating components of a first host-based data storage system 200 in accordance with embodiments of the present invention is shown. First host-based data storage system 200 is similar to first non host-based storage system 100 of Figure 1a, except storage controller 108 is within host computer 104. Storage controller 108 interfaces through a local bus of host computer 104, where the local bus may be any suitable bus for high speed transfers between the CPU of host computer 104 and storage controller 108, including RapidIO, PCI, PCI-X, or PCI Express. Storage controller 108 may either be integrated on the motherboard of host computer 104, or may be an add-in board or other form of assembly in host computer 104.

Figure 2B:
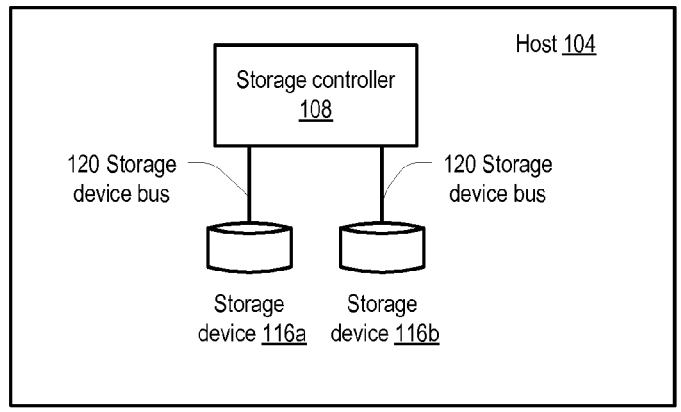
FIG. 2b is a block diagram illustrating components of a second host-based data storage system in accordance with embodiments of the present invention.

Referring now to FIG. 2b, a block diagram illustrating components of a second host-based data storage system 204 in accordance with embodiments of the present invention is shown. Second host-based data storage system 204 integrates the functions of storage subsystem 124 into host computer 104. Data storage system 204 represents a self-contained highly integrated data storage system.

Figure 2C:
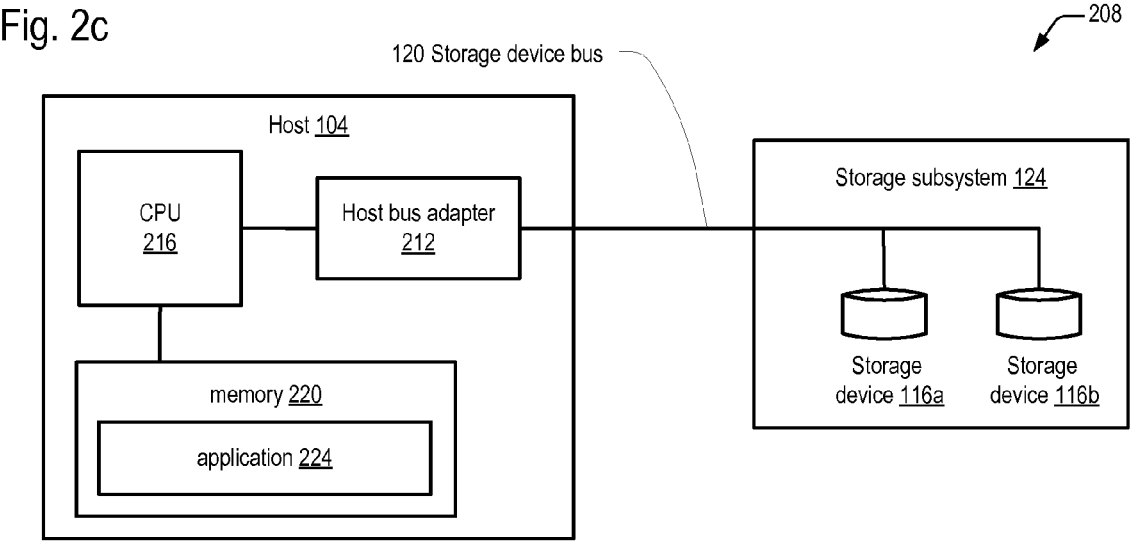
FIG. 2c is a block diagram illustrating components of a third host-based data storage system in accordance with embodiments of the present invention.

Referring now to FIG. 2c, a block diagram of illustrating components of a third host-based data storage system 208 in accordance with embodiments of the present invention is shown. Third host-based data storage system 208 is similar to first host-based data storage system 200, but instead of an integrated storage controller 108, a software-based approach is used. Interface between host computer 104 and storage device bus 120 is provided by host bus adapter 212, which provides appropriate data and command buffering functions as well as protocol control and low-level error handling. CPU 216 executes applications 224 in memory 220 to control data flow between memory 220 and storage devices 116a, 116b in storage subsystem 124.

Referring now to FIG. 3, a block diagram illustrating a component-level storage system 300 in accordance with embodiments of the present invention is shown. Component-level storage system 300 includes one or more host computers 304, and may be organized into any host-based or non host-based organization represented in FIGS. 1a-1c and 2a-2c. However, for clarity, storage controller 308 is shown separately from host computer 304.

Storage controller 308 includes a CPU, or processor 312, which executes stored programs in memory 320 that manage data transfers between host computers 304 and storage tier 328. CPU 312 includes any processing device suitable for executing storage controller 108 programs, such as Intel x86-compatible processors, embedded processors, mobile processors, and/or RISC processors. CPU 312 may include several devices including memory controllers, North Bridge devices, and/or South Bridge devices. Host computers 304 generate host read and write I/O requests 324 to storage controller 308. Multiple host computers 304 may interact with storage controller 308, and storage controller 308 may represent two or more redundant storage controllers 308.

CPU 312 is coupled to storage controller memory 320. Storage controller memory 320 generally includes both non-volatile memory and volatile memory. The memory 320 includes firmware which includes program instructions that CPU 312 fetches and executes, including program instructions for the processes of the present invention. Examples of non-volatile memory 320 include, but are not limited to, flash memory, SD, EPROM, EEPROM, hard disks, and NOVRAM. Volatile memory 320 stores various data structures and in the preferred embodiment contains a write cache 316. In other embodiments, the write cache 316 may be stored in non-volatile memory 320. Examples of volatile memory 320 include, but are not limited to, SRAM, DDR RAM, DDR2 RAM, DDR3 RAM, Z-RAM, TTRAM, A-RAM, ETA RAM, and other forms of temporary memory. The write cache 316 of memory 320 provides fast access storage for several page table data structures that will be described in more detail with reference to the following figures.

It should be understood that storage controller 308 may be functionally organized in countless different functional organizations and architectures without diverting from the scope or operation of the present invention.

In a component-level storage system 300 of the present invention, storage devices 116 are organized into one or more storage tiers 328, with one or more components 332 in each storage tier 328. In the simple embodiment illustrated in FIG. 3, component-level storage system 300 includes a single storage tier 328 containing three components: component A 332a, component B 332b, and component C 332c. Each component 332a, 332b, 332c includes pages 336. Each component 332 may contain a different number of pages 336, and the number of pages 336 in a given component 332 may increase or decrease over time. Components 332 may be deleted, and new components 332 may be added. Page 336 size depends on many factors including the total capacity of storage in storage devices 116, the desired granularity of storage, and addressing complexity. In the preferred embodiment, the size of each page 336 is 4M Bytes.

Referring now to FIG. 4, a block diagram illustrating LUN 404 and page table 408, 412 relationships in accordance with embodiments of the present invention is shown. Host computers 104 generate read and write requests 324 to Logical Unit Numbers (LUNs) 404 through block level protocols including SCSI, often encapsulated with transport protocols such as Fibre Channel or Ethernet. In the embodiment illustrated in FIG. 4, three LUNs 404 are present: LUN A 404a, LUN B 404b, and LUN C 404c. LUNs 404 are usually, but not necessarily, contained within a single component 332 of a single storage tier 328. However, a given component 332 may include multiple LUNs 404.

Storage controllers 108, 308 translate logical addresses to LUNs 404 into physical addresses to specific storage devices 116 through page table 408, 412 structures. In one embodiment, a single set of page tables 408 perform the translation. However, in the preferred embodiment a dual page table structure consisting of top-level page tables 408 (TLPT) and bottom-level page tables 412 (BLPT) perform the translation. It should be noted that the present invention includes any number of page table 408, 412 levels, including three or more page table levels. Any given page table 408, 412 corresponds to a specific LUN 404.

Top-level page tables 408 translate logical addresses to a given LUN 404 into bottom level page table 412 addresses. In FIG. 4, TLPTa 408a translates between LUN A 404a and multiple BLPTs a 412a, TLPTb 408b and TLPTc 408c translate between LUN B 404b and BLPTs b 412b and BLPTs c 412c, and TLPTd 408d, TLPTe 408e, and TLPTf 408f translate between LUN C 404c and BLPTs d 412d, BLPTs e 412e, and BLPTs f 412f. TLPT 408 and BLPT 412 structures are discussed in more detail with respect to FIGS. 5, 7, and 8.

Referring now to FIG. 5, a block diagram illustrating a two-level page table organization in accordance with embodiments of the present invention is shown. Each top-level page table 408 (TLPT) includes a number of TLPT entries 504, where each TLPT entry 504 has a corresponding bottom level page table 412 (BLPT). TLPTs 408 and BLPTs 412 are stored in multiple locations in case portions of any one location become corrupted; it is possible to retrieve an uncorrupted TLPT 408/BLPT 412 from a different location. For example, TLPTs 408/BLPTs 412 may be stored on metadata regions of physical storage devices 116, in a write cache 316 of a first storage controller 108a, in a write cache 316 of a second storage controller 108b, or within a memory area 220 of a host computer 104. Although TLPT 408 and BLPTs 412 may be in write cache 316, which is desirable since write cache memories 316 provide fast access to data as well known in the art, in other embodiments one or both of TLPT 408/BLPTs 412 are stored elsewhere.

In the preferred embodiment, both the TLPT 408 and the BLPT 412 are 32K Bytes each. Each TLPT 408 has 8,192 entries each of 4 bytes, for a total of 32K Bytes. Each BLPT 412 has 4,096 entries each of 8 bytes, for a total of 32K Bytes.

Referring now to FIG. 6a, a block diagram illustrating a Logical Block Address (LBA) 608 in accordance with embodiments of the present invention is shown. Each host read or write request 324 includes a Logical Block Address (LBA) 608, indicating where the read or write is directed to. LBAs are 64 bits in length.

Referring now to FIG. 6b, a block diagram illustrating a Logical Block Address (LBA) 608 and page table relationship in accordance with embodiments of the present invention is shown. In an embodiment using a two-level page table structure with TLPTs 408 and BLPTs 412, LBA 608 includes three ranges of page-related address bits. Starting with the most significant bits (MSBs), a BLPT ID 612 is provided. The BLPT ID 612 identifies a specific BLPT 412, and there is a different BLPT ID 612 for each TLPT entry 504. In the preferred embodiment, the LBA 608 is 64 bits and includes a BLPT ID 612 of 13 bits—which yields $2^{13}$ BLPTs in a volume.

Next, the BLPT index 616 identified the specific page 336 the LBA 608 is directed to. In the preferred embodiment, the BLPT index 616 is 12 bits, which yields $2^{12}$ pages in a BLPT.

Finally, the page index 620 specifies the address within the page 336 specified by the BLPT index 616. In the preferred embodiment, the page index 620 is 13 bits, which yields $2^{13}$ 512-byte blocks in a page, or 4M Bytes.

The number of bits allocated to page indexes 620 and BLPT IDs/Indices 612, 616 is system dependent, and may be different than previously described based on design considerations including block size, speed of lookup, metadata storage space, and so on.

Referring now to FIG. 7a, a block diagram illustrating protection information bit storage in a top-level page table 408 in accordance with embodiments of the present invention is shown. Top-level page tables 408 include TLPT entries 504, shown as TLPT entry 0 504a through TLPT entry z 504z. In the preferred embodiment, there are 8,192 TLPT entries 504 in a TLPT 408, where each TLPT entry 504 is 4 bytes.

TLPT entries 504 in the illustrated embodiment include 2 bytes of TLPT flags 728 and 2 bytes of BLPT ID 704. TLPT flags 728 include 16 bits that provide information about the TLPT entries 504, such as whether a specific TLPT entry 504 is currently locked. The present invention provides serial storage of page table protection information within a designated bit or bits of TLPT flags 728. In one embodiment, a serial number 716 and a cyclic redundancy check (CRC) 720 are provided. The serial number 716 has 128 bits, identified as bit $SN_{00}$ in bit $716_{00}$ through bit $SN_{127}$ in bit $716_{127}$. The CRC has 16 bits, identified as bit $CRC_{00}$ in bit $720_{00}$ through bit $CRC_{15}$ in bit $720_{15}$. In a preferred embodiment, a single bit (bit 716, for example) is dedicated to storing all protection information within TLPT entries 504. Therefore, a 128 bit serial number may be stored in bit $SN_{00}$ in bit $716_{00}$ through bit $SN_{127}$ in bit $716_{127}$, and a 16-bit CRC may be stored in bit $CRC_{00}$ in bit $716_{128}$ through bit $CRC_{15}$ in bit $716_{143}$. In this latter embodiment, the 144 bits of protection information only take up one bit of TLPT flags 728 in 144 TLPT entries 504. Other embodiments are possible that use other bits 708, 712, 724 of TLPT flags 728, or use different TLPT entries 504.

It should be noted that identification of bit position 716, 720 and the range of TLPT entries 504 used to store these bits may be stored in storage controller memory 320, hard coded into firmware executed by storage controller 108, 308, or stored within a memory controller that accesses a memory 320.

Referring now to FIG. 7b, a block diagram illustrating protection information bit storage in a bottom-level page table 412 in accordance with embodiments of the present invention is shown. Each BLPT entry 732 is 8 bytes and includes a component ID 740 and BLPT flags/page number 736. Component ID 740 is a 4-byte field that uniquely identifies the component 332 that the BLPT entry 732 describes. Each component 332 has a different component ID 740.

BLPT flags/page number 736 is a 4-byte field including a page number 744 and BLPT flags. In the preferred embodiment, the page number 744 is 26 bits and there are 6 BLPT flags in each BLPT entry 732. The page number 744 uniquely identifies a specific page number 336 in a given component 332. Although only three bits of BLPT flags 716, 720, and 748 are shown in FIG. 7b, it should be understood that other bits may be present.

BLPT flags 716, 720, 748 provide storage for CRC (bit 720), TLPT index (bit 748), and serial number (bit 716). In the embodiment illustrated, CRC 720 and serial number 716 are redundantly serially stored in both the TLPT 408 and BLPT 412. However, in other embodiments different protection information may be stored, and the bit position within a given TLPT/BLPT may be different than shown. Additionally, in the preferred embodiment, a given BLPT 412 stores protection information serially in the same bit 720, 716, 748 instead of using different bits. For example, a 128 bit serial number may be stored in bit $SN_{00}$ in bit $720_{00}$ through bit $SN_{127}$ in bit $720_{127}$, a 16-bit CRC may be stored in bit $CRC_{00}$ in bit $720_{128}$ through bit $CRC_{15}$ in bit $720_{143}$, and a 16-bit TLPT index may be stored in bit $IPG_{00}$ in bit $720_{144}$ through bit $IPG_{15}$ in bit $720_{159}$. In this latter embodiment, 160 bits of protection information only take up one bit of BLPT flags 720 in 160 BLPT entries 732. Other embodiments are possible that use other bits of BLPT flags/page number 736, or use different BLPT entries 732.

As described earlier with reference to FIG. 5, a given BLPT 412 corresponds to one TLPT entry 504 of a TLPT 408. Therefore, TLPT index bits 748 within a given BLPT 412 correspond to a given BLPT ID 704 in a given TLPT entry 504.

It should be noted that identification of bit position 716, 720, 748 and the range of BLPT entries 732 used to store these bits may be stored in storage controller memory 320, hard coded into firmware executed by storage controller 108, 308, or stored within a memory controller that accesses a memory 320.

First protection data is any of metadata protection data 716, 720, 748 stored in a TLPT 408 or BLPT 412. Second protection data is the same type of metadata protection data 716, 720, 748 as first protection data, but stored in a different location. Therefore, if first protection data is stored in a TLPT 408, second protection data may be stored in a BLPT 412 corresponding to the TLPT 408, or in a TLPT 408/BLPT 412 of a memory 320 of a different storage controller 108, 308, or in a storage device 116. Third protection data is the same type of metadata protection data 716, 720, 748 as first protection data and second protection data, but stored in a different location from either of the first protection data or the second protection data. Metadata protection data 716, 720, 748 is page-level metadata.

Referring now to FIG. 8a, a block diagram illustrating cyclic redundancy check (CRC) bits 720 from TLPT 504 and BLPT 732 entries in accordance with embodiments of the present invention is shown. CRC bits 720 represent a first form of protection information to verify the integrity of page table metadata.

The preferred embodiment utilizes a 16-bit (2 byte) CRC 720 for each TLPT 408 and BLPT 412. Therefore, 16 CRC bits 720 are used, identified as $CRC_{00}$ $720_{00}$ through $CRC_{15}$ $720_{15}$. In other embodiments, fewer or more than 16 bits of CRC 720 are used. When a CRC check is performed, the CRC bits 720 are extracted from selected TLPT entries 504 or BLPT entries 732. When a new CRC is calculated, the CRC bits 720 are stored in selected TLPT entries 504 and BLPT entries 732. For simplicity, it may be desirable to store the CRC bits 720 in the same bit position and entry 504, 732 of a TLPT 408/BLPT 412. This will make lookup faster since only a single set of bit locations is used for all tables 408, 412. However, this is not a requirement and each table 408, 412 may have common or different CRC bit 720 locations from other tables 408, 412.

Referring now to FIG. 8b, a block diagram illustrating Logical Unit Number (LUN) serial number bits 716 from TLPT 504 and BLPT 732 entries in accordance with embodiments of the present invention is shown. LUN serial number 716 bits represent a second form of protection information to verify the integrity of page table metadata.

The preferred embodiment utilizes a 128-bit (16 byte) LUN serial number for each TLPT 408 and BLPT 412. Therefore, 128 SN bits 716 are used, identified as $SN_{00}$ $716_{00}$ through $SN_{127}$ $716_{127}$. In other embodiments, fewer or more than 128 bits of SN 716 are used. When a LUN serial number check is performed, the SN bits 716 are extracted from selected TLPT entries 504 or BLPT entries 732. When a new LUN serial number is calculated, the SN bits 716 are stored in selected TLPT entries 504 and BLPT entries 732. For simplicity, it may be desirable to store the SN bits 716 in the same bit position and entry 504, 732 of a TLPT 408/BLPT 412. This will make lookup faster since only a single set of bit locations is used for all tables 408, 412. However, this is not a requirement and each table 408, 412 may have common or different SN bit 716 locations from other tables 408, 412.

Referring now to FIG. 8c, a block diagram illustrating TLPT index bits 748 from BLPT entries 732 in accordance with embodiments of the present invention is shown. TLPT index bits 748 represent a third form of protection information to verify the integrity of page table metadata.

The preferred embodiment utilizes a 16-bit (2 byte) TLPT index 748. Therefore, 16 IPG bits 748 are used, identified as $IPG_{00}$ $748_{00}$ through $IPG_{15}$ $748_{15}$. In other embodiments, fewer or more than 16 bits of TLPT index IPG 748 are used. When a TLPT index check is performed, the IPG bits 748 are extracted from selected BLPT entries 732. IPG bits 748 are stored in selected BLPT entries 732.

Referring now to FIG. 9, a block diagram illustrating metadata protection information in accordance with embodiments of the present invention is shown. There are three primary locations for stored protection information: within an LBA 608 of a new read or write request 324, in a TLPT 408, or in a BLPT 412. However, TLPTs 408 and BLPTs 412 are stored in multiple locations to add redundancy and increase reliability.

Each LBA 608 includes a BLPT ID 612, which provides a reference to the TLPT index 748 stored in BLPTs 412. BLPT ID 612 is compared to TLPT index 748 to verify page table integrity as illustrated in blocks 1144-1152 of FIG. 11a.

Each TLPT 408 includes TLPT flags 728, which contain a CRC 720 and a LUN serial number 716. CRC 720 stored in a TLPT 408 is compared to CRC 720 stored in a BLPT 412 to verify page table integrity as illustrated in blocks 1108-1124 of FIG. 11a. LUN serial number 716 stored in a TLPT 408 is compared to LUN serial number 716 stored in a BLPT 412 to verify page table integrity as illustrated in blocks 1128-1140 of FIG. 11*a*.

Each BLPT 412 includes BLPT flags/page number 736, which contain a CRC 720, a LUN serial number 716, and a TLPT index 748. CRC 720 stored in a TLPT 408 is compared to CRC 720 stored in a BLPT 412 to verify page table integrity as illustrated in blocks 1108-1124 of FIG. 11*a*. LUN serial number 716 stored in a TLPT 408 is compared to LUN serial number 716 stored in a BLPT 412 to verify page table integrity as illustrated in blocks 1128-1140 of FIG. 11*a*. Finally, BLPT ID 612 is compared to TLPT index 748 to verify page table integrity as illustrated in blocks 1144-1152 of FIG. 11*a*.

Referring now to FIG. 10, a flowchart illustrating a create/update TLPT or BLPT process in accordance with embodiments of the present invention is shown. Flow begins at block 1004.

At block 1004, a storage controller 108, 308 initiates an operation to allocate, de-allocate, or move a page 336 within a component 332 or between components 332. Allocate, de-allocate, and move page 336 operations affect the number of pages 336 in components 332, and therefore the metadata for page tables 408, 412 changes accordingly. Flow proceeds to block 1008.

At block 1008, the storage controller 108, 308 updates component ID 740, page number 744, and TLPT index 748 for each affected TLPT entry 504 and BLPT entry 732 affected by the allocate, de-allocate, or move page operation. The updates made to TLPT entries 504 and BLPT entries 732 reflect the component 332 and page 336 configuration following the allocate, de-allocate, or move page operation. Flow proceeds to block 1012.

At block 1012, the storage controller 108, 308 updates the non-CRC bits for each affected TLPT entry 504 or BLPT entry 732. The non-CRC bits are the bits of all flags other than CRC bits 720 of TLPT flags 728 and BLPT flags/page number 736. CRC bits 720 are updated last since a new CRC needs to be calculated for the affected TLPT 408. Therefore, the non-CRC flags 728, 736 are updated first, reflecting the allocate, de-allocate, and move page operation. Flow proceeds to block 1016.

At block 1016, the storage controller 108, 308 writes zero values to all CRC bits 720 for the TLPT 408 affected by the allocate, de-allocate, or move page operation. Writing zeroes to the CRC bits 720 initializes the TLPT 408 in preparation for calculating a new CRC for the TLPT 408. Flow proceeds to block 1020.

At block 1020, the storage controller calculates a new CRC for the TLPT 408 affected by the allocate, de-allocate, or move page operation. The new CRC is a parallel value as represented in FIG. 8*a*. Flow proceeds to block 1024.

At block 1024, the storage controller 108, 308 writes bitwise the new CRC to each TLPT 408 and BLPT 412. The new CRC is represented as illustrated in FIGS. 7*a* and 7*b*, where CRC bits 720 of selected TLPT entries 504 and BLPT entries 732 are individually populated with the new CRC value. The TLPT 408 affected by the allocate, de-allocate, or move page operation, and all BLPTs 412 referenced by that TLPT 408 will have the new CRC written to the CRC bits 720 in the TLPT 408 and BLPT 412. Flow ends at block 1024.

Referring now to FIG. 11*a*, a flowchart illustrating a check component metadata process in accordance with embodiments of the present invention is shown. Flow begins at block 1104.

At block 1104, the storage controller 108, 308 identifies the TLPT 408 corresponding to a read data LBA 608. Flow proceeds to block 1108.

At block 1108, the storage controller 108, 308 reads CRC bits 720 from the TLPT 408 corresponding to the read data LBA 608 from block 1104, or the TLPT/BLPT corresponding to the copy of component metadata identified in block 1168 of FIG. 11*b*. Flow proceeds to block 1112.

At block 1112, the storage controller 108, 308 reads the CRC bits 720 in the TLPT 408 corresponding to the read data LBA 608, or the TLPT/BLPT corresponding to the copy of component metadata. Flow proceeds to block 1116.

At block 1116, the storage controller 108, 308 calculates the CRC for the entire TLPT 408. Flow proceeds to block 1120.

At block 1120, the storage controller 108, 308 compares the read CRC from block 1108 to the calculated CRC from block 1116. Flow proceeds to decision block 1124.

At decision block 1124, the storage controller 108, 308 determines if the read CRC from block 1108 is the same as the calculated CRC from block 1116. If the read CRC from block 1108 matches the calculated CRC from block 1116, then flow proceeds to block 1128. If the read CRC from block 1108 does not match the calculated CRC from block 1116, then flow proceeds to block 1160 of FIG. 11*b*.

At block 1128, the storage controller 108, 308 reads a LUN serial number 716 from a storage device 116 or memory 320. In one embodiment, the LUN serial number 716 is stored in a BLPT 412 corresponding to the TLPT 408 associated with the read data LBA 608. In another embodiment, the LUN serial number 716 is stored in a TLPT 408 or BLPT 412 in a memory 320 of a redundant controller 108, 308 corresponding to the TLPT 408 associated with the read data LBA 608. In yet another embodiment, the LUN serial number 716 is stored in a TLPT 408 or BLPT 412 corresponding to the copy of component metadata identified in block 1168 of FIG. 11*b*. Flow proceeds to block 1132.

At block 1132, the storage controller 108, 308 reads the LUN serial number 716 from the TLPT 408 corresponding to the read data LBA 608, or the TLPT/BLPT corresponding to the copy of component metadata. Flow proceeds to block 1136.

At block 1136, the storage controller 108, 308 compares the LUN serial number 716 from the storage device 116 or memory 320 to the LUN serial number 716 from the TLPT 408 corresponding to the read data LBA 608 or the copy of component metadata. Flow proceeds to decision block 1140.

At decision block 1140, the storage controller 108, 308 determines if the LUN serial number 716 from the storage device 116 or memory 320 matches the LUN serial number 716 from the TLPT 408 corresponding to the read data LBA 608 or the copy of component metadata. If the LUN serial number 716 from the storage device 116 or memory 320 matches the LUN serial number 716 from the TLPT 408 corresponding to the read data LBA 608 or the copy of component metadata, then flow proceeds to block 1144. If the LUN serial number 716 from the storage device 116 or memory 320 does not match the LUN serial number 716 from the TLPT 408 corresponding to the read data LBA 608 or the copy of component metadata, then flow proceeds to block 1160 of FIG. 11*b*.

At block 1144, the storage controller 108, 308 reads a TLPT index 748 from a BLPT 412 corresponding to the TLPT 408 associated with the read data LBA 608 or the copy of component metadata. Flow proceeds to block 1148.

At block 1148, the storage controller 108, 308 compares the TLPT index 748 from the BLPT 412 corresponding to the TLPT 408 associated with the read data LBA 608 or the copy of component metadata to the BLPT ID 612 of the read data LBA 608. Flow proceeds to decision block 1152.

At decision block 1152, the storage controller 108, 308 determines if the TLPT index 748 from the BLPT 412 corresponding to the TLPT 408 associated with the read data LBA 608 or the copy of component metadata matches the BLPT ID 612 of the read data LBA 608. If the TLPT index 748 from the BLPT 412 corresponding to the TLPT 408 associated with the read data LBA 608 or the copy of component metadata matches the BLPT ID 612 of the read data LBA 608, then flow proceeds to block 1156. If the TLPT index 748 from the BLPT 412 corresponding to the TLPT 408 associated with the read data LBA 608 or the copy of component metadata does not match the BLPT ID 612 of the read data LBA 608, then flow proceeds to block 1160 of FIG. 11*b*.

At block 1156, the storage controller 108, 308 reads data from the selected page 336 corresponding to the read data LBA 608. Flow ends at block 1156.

Although the process of FIG. 11*a* illustrates three different check processes, it should be understood that the present invention includes any number of check processes, even a single check processes. Additionally, although the process of FIG. 11*a* illustrates a CRC check process followed by a LUN serial number check process, followed by a TLPT index check process, it should be understood that various forms of metadata protection information may be checked in any sequence or order, and different forms of metadata protection information than CRC, LUN serial number, or TLPT index are included within the scope of the present invention.

Referring now to FIG. 11*b*, a flowchart illustrating an alternate component metadata identification process in accordance with embodiments of the present invention is shown. Flow begins at block 1160.

At block 1160, the storage controller 108, 308 searches for another copy of component metadata. There are at least two components 332 in a storage tier 328, and each component 332 has a full copy of all metadata stored in some combination of TLPTs and BLPTs. Block 1160 is executed by the storage controller 108, 308 whenever one of a CRC check (block 1124 of FIG. 11*a*), LUN serial number check (block 1140 of FIG. 11*a*, or a TLPT index check (block 1152 of FIG. 11*a*) is failed. Since there are at least two components 332 in a storage tier 328, there will always be at least one copy of component metadata in another TLPT 408/BLPT 412 to through in the event of a failure in an original TLPT 408/BLPT 412. In addition to alternate metadata copies per additional components 332, mirrored data structures between redundant controllers 108*a*, 108*b*, and RAID technology used on storage devices 116 to allow availability to data in the event of storage device 116 failure provide additional metadata copies, if needed. Flow proceeds to decision block 1164.

At decision block 1164, the storage controller 108, 308 determines if another copy of component metadata is available, beyond the original component metadata of FIG. 11*a* and copies of component metadata that have already been checked while executing the process of FIG. 11*b*. If another component metadata copy is available, then flow proceeds to block 1168. If another component metadata copy is not available, then flow proceeds to block 1172.

At block 1168, the storage controller 108, 308 reads the TLPT 408/BLPT 412 from the alternate component metadata identified in blocks 1160 and 1164. The alternate component metadata provides an alternate redundant storage location for CRC bits 720, LUN serial number 716, and TLPT index 748. Flow proceeds to block 1108 of FIG. 11*b*.

At block 1172, the storage controller 108, 308 initiates conventional error handling processes, since at least one of the CRC 720, LUN serial number 716, and TLPT index 748 is possibly corrupted and no further alternate metadata locations are available. In one embodiment, the storage controller 108, 308 determines the metadata corresponding to the read data LBA 608 is unreliable and marks the pages 336 of the affected component 332 invalid. In other embodiments, the storage controller 108, 308 takes other appropriate actions, including copying consistent protection metadata over inconsistent protection metadata. Flow ends at block 1172.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method for protecting page-level metadata in a storage system, comprising:
   providing in a page table first protection data;
   receiving a command to read data from a page of the storage system corresponding to the page table;
   comparing first protection data to second protection data;
   if the first protection data is different than the second protection data, then:
      identifying third protection data in the storage system; and
      comparing the third protection data to the first protection data;
   if the third protection data is different than the first protection data, then determining that the page-level metadata is inconsistent.

2. The method of claim 1, the first, second, and third protection data each comprising at least one of cyclic redundancy check data and a LUN serial number.

3. The method of claim 2, wherein the first protection data is arranged bitwise serially in sequential entries of the page table.

4. The method of claim 3, wherein the number of bits in the page table is a power of two.

5. The method of claim 4, further comprising:
   receiving a command to one of allocate, de-allocate, and move a page of the storage system corresponding to the page table.

6. The method of claim 5, wherein in response to receiving the command to one of allocate, de-allocate, and move the page, the method further comprising:
   updating a component ID and a page number in the page table;
   writing a predetermined value to cyclic redundancy check bits in the page table;
   calculating new cyclic redundancy check data for the page table; and
   writing the new cyclic redundancy check data into cyclic redundancy check bits of the page table.

7. The method of claim 6, wherein the second and third protection data is stored in at least one of a storage device, a storage controller memory, a LUN, and a Logical Block Address.

8. The method of claim 7, wherein the page table is a top-level page table, wherein a bottom-level page table comprises the third protection data, wherein the bottom-level page table comprises a top-level page table index that corresponds to a location in the top-level page table.

9. The method of claim 8, wherein the third protection data comprises the top-level page table index, wherein the third protection data is arranged bitwise serially in sequential entries of the bottom-level page table.

10. A storage system for protecting page-level metadata, comprising:
at least one storage device, comprising:
at least one component, comprising:
at least one page; and
a storage controller coupled to the at least one storage device, comprising:
a processor; and
a memory, coupled to the processor, comprising:
a page table, comprising first protection data,
wherein in response to the storage controller receiving a command to read data from a page of the storage system corresponding to the page table, the processor compares the first protection data to second protection data, wherein if the processor determines that the first protection data is different than the second protection data, the processor identifies third protection data in the storage system and compares the third protection data to the first protection data, wherein if the processor determines the third protection data is different than the first protection data, the processor determines that the page-level metadata is inconsistent.

11. The storage controller of claim 10, wherein the first, second, and third protection data each comprises at least one of cyclic redundancy check data and a LUN serial number.

12. The storage controller of claim 11, wherein the first protection data is arranged bitwise serially in sequential entries of the page table.

13. The storage controller of claim 12, wherein the number of bits in the page table is a power of two, wherein if the processor determines the third protection data is the same as than the second protection data, the processor copies the third protection data over the first protection data.

14. The storage controller of claim 13, wherein the storage controller receives a command to one of allocate, de-allocate, and move a page of the storage system corresponding to the page table.

15. The storage controller of claim 14, wherein in response to receiving the command to one of allocate, de-allocate, and move the page, the processor updates a component ID and a page number in the page table, writes a predetermined value to cyclic redundancy check bits in the page table, calculates new cyclic redundancy check data for the page table, and writes the new cyclic redundancy check data into cyclic redundancy check bits of the page table.

16. The storage controller of claim 15, wherein the second and third protection data is stored in at least one of the at least one storage device, the storage controller memory, a LUN, and a Logical Block Address.

17. The storage controller of claim 16, wherein the page table is a top-level page table, wherein the memory comprises a bottom-level page table comprising the third protection data, the bottom-level page table comprising a top-level page table index that corresponds to a location in the top-level page table.

18. The storage controller of claim 17, wherein the third protection data comprises the top-level page table index, wherein the third protection data is arranged bitwise serially in sequential entries of the bottom-level page table.

19. A storage controller for protecting page-level metadata in a storage system, comprising:
a processor; and
a memory, coupled to the processor, comprising a page table,
wherein the storage controller stores data on one or more storage devices of the storage system, wherein the one or more storage devices comprises one or more components, wherein the one or more components comprises one or more pages, the one or more pages corresponding to entries of the page table,
wherein the storage controller maintains first, second, and third protection data corresponding to the page table, wherein the processor compares the first protection data to the second protection data, wherein if the processor determines that the first protection data is different than the second protection data, the processor compares third protection data to the first protection data, wherein if the processor determines the third protection data is different than the first protection data, the processor determines that the page-level metadata is inconsistent,
wherein the storage controller determines a page must be allocated, de-allocated, or moved within or between the one or more components, wherein the storage controller updates a component ID and a page number in an entry of the page table, wherein the storage controller calculates protection information for the page table and writes the protection information bitwise into sequential entries of the page table.

20. The storage controller of claim 19, wherein the storage controller receives a command to read data from a page of the storage system corresponding to the page table, and in response determines if the protection information is valid, wherein if the protection information is valid the storage controller reads the data from the page of the storage system corresponding to the page table.

* * * * *